US010926416B2

United States Patent
Soltani Bozchalooi et al.

(10) Patent No.: US 10,926,416 B2
(45) Date of Patent: Feb. 23, 2021

(54) ROBOTIC MANIPULATION USING AN INDEPENDENTLY ACTUATED VISION SYSTEM, AN ADVERSARIAL CONTROL SCHEME, AND A MULTI-TASKING DEEP LEARNING ARCHITECTURE

(71) Applicant: Ford Global Technologies, LLC, Dearborn, MI (US)

(72) Inventors: Iman Soltani Bozchalooi, Sacramento, CA (US); Francis Assadian, Davis, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 16/197,641

(22) Filed: Nov. 21, 2018

(65) Prior Publication Data
US 2020/0156255 A1    May 21, 2020

(51) Int. Cl.
| | |
|---|---|
| *B25J 9/16* | (2006.01) |
| *G06K 9/00* | (2006.01) |
| *G06K 9/62* | (2006.01) |
| *H04N 5/232* | (2006.01) |
| *H04N 5/247* | (2006.01) |
| *H04N 5/225* | (2006.01) |

(52) U.S. Cl.
CPC .............. *B25J 9/1697* (2013.01); *B25J 9/163* (2013.01); *G06K 9/00664* (2013.01); *G06K 9/6262* (2013.01); *H04N 5/23299* (2018.08); *H04N 5/247* (2013.01); *B25J 9/1669* (2013.01); *H04N 2005/2255* (2013.01)

(58) Field of Classification Search
CPC ........ B25J 9/1697; B25J 9/163; B25J 9/1669; H04N 5/23299; H04N 5/247; H04N 2005/2255; G06K 9/00664; G06K 9/6262
See application file for complete search history.

(56) References Cited

U.S. PATENT DOCUMENTS

| | | | | |
|---|---|---|---|---|
| 4,364,629 | A | * 12/1982 | Lang | .................. A61B 1/00193 |
| | | | | 359/377 |
| 4,942,539 | A | * 7/1990 | McGee | .................. B25J 9/1697 |
| | | | | 348/42 |

(Continued)

FOREIGN PATENT DOCUMENTS

| | | |
|---|---|---|
| CN | 104325268 | 2/2015 |
| CN | 106094516 | 11/2016 |
| CN | 107186708 | 9/2017 |

OTHER PUBLICATIONS

Hager, G.D. et al., Feature-Based Visual Servoing and its Application to Telerobotics, published in Proceedings of IEEE/RSJ International Conference on Intelligent Robots and Systems (IROS), 1994, available at URL: https://ieeexplore.ieee.org/document/407395/.

*Primary Examiner* — Oschta I Montoya

(74) *Attorney, Agent, or Firm* — Burris Law, PLLC

(57) ABSTRACT

An automation system includes a manipulation system including a manipulator for moving an object to a target location, a vision system for detecting landmarks on the object and the target location, and a learning and control module. The vision system is movable. The learning and control module is configured to control a movement of the manipulator and change a field of view of the vision system independent of the movement of the manipulator.

19 Claims, 5 Drawing Sheets

(56) References Cited

U.S. PATENT DOCUMENTS

| | | | | |
|---|---|---|---|---|
| 4,945,493 A | | 7/1990 | Huang et al. | |
| 5,061,995 A | * | 10/1991 | Lia | A61B 1/07 348/68 |
| 5,148,591 A | * | 9/1992 | Pryor | A01B 69/008 29/407.04 |
| 5,956,417 A | * | 9/1999 | Pryor | A01B 69/008 382/154 |
| 6,328,523 B1 | * | 12/2001 | Watanabe | B25J 9/1687 198/396 |
| 6,490,369 B1 | * | 12/2002 | Beiman | G06K 9/42 382/151 |
| 6,633,338 B1 | * | 10/2003 | Pelsue | G01N 21/8806 348/31 |
| 6,681,151 B1 | * | 1/2004 | Weinzimmer | B25J 9/1697 219/121.85 |
| 6,816,755 B2 | * | 11/2004 | Habibi | B25J 9/1697 318/568.11 |
| 7,313,464 B1 | * | 12/2007 | Perreault | B25J 9/1666 318/568.1 |
| 8,085,043 B2 | * | 12/2011 | Grimme | G01R 33/4833 324/309 |
| 8,095,237 B2 | * | 1/2012 | Habibi | B25J 9/1692 700/245 |
| 8,315,739 B2 | * | 11/2012 | Dai | B25J 9/1697 382/153 |
| 8,634,635 B2 | * | 1/2014 | Bai | A01K 29/005 382/154 |
| 9,393,694 B2 | * | 7/2016 | Wallack | B25J 9/1692 |
| 9,815,204 B2 | | 11/2017 | Hull | |
| 10,012,568 B1 | * | 7/2018 | Backes | E21B 7/027 |
| 10,362,204 B2 | * | 7/2019 | Edwards | B25J 1/02 |
| 10,732,643 B2 | * | 8/2020 | Hiramatsu | G06K 9/00221 |
| 2003/0181800 A1 | * | 9/2003 | Bonutti | A61B 17/0401 600/407 |
| 2004/0233461 A1 | * | 11/2004 | Armstrong | G01C 11/025 356/620 |
| 2004/0243282 A1 | * | 12/2004 | Watanabe | B25J 9/1697 700/259 |
| 2005/0002555 A1 | * | 1/2005 | Kumiya | G06T 7/75 382/153 |
| 2006/0088203 A1 | * | 4/2006 | Boca | G06K 9/32 382/153 |
| 2007/0276539 A1 | * | 11/2007 | Habibi | B25J 9/1612 700/245 |
| 2009/0033655 A1 | * | 2/2009 | Boca | B25J 9/1697 345/419 |
| 2009/0192524 A1 | * | 7/2009 | Itkowitz | G06F 19/00 606/130 |
| 2010/0092032 A1 | * | 4/2010 | Boca | B25J 9/1679 382/103 |
| 2010/0261961 A1 | * | 10/2010 | Scott | A61B 1/00193 600/111 |
| 2011/0071675 A1 | * | 3/2011 | Wells | G06K 9/3216 700/250 |
| 2012/0147149 A1 | * | 6/2012 | Liu | G06T 7/75 348/50 |
| 2012/0249737 A1 | * | 10/2012 | Sood | H04N 13/214 348/45 |
| 2012/0290134 A1 | * | 11/2012 | Zhao | B25J 9/1689 700/259 |
| 2012/0307027 A1 | * | 12/2012 | Popovic | B25J 9/1697 348/65 |
| 2013/0147944 A1 | * | 6/2013 | Zhang | G06T 7/80 348/95 |
| 2015/0168710 A1 | * | 6/2015 | Zobel | A61B 1/00105 348/45 |
| 2016/0082597 A1 | * | 3/2016 | Gorshechnikov | G06N 5/02 700/253 |
| 2016/0088204 A1 | * | 3/2016 | Liang | A61B 1/04 348/68 |
| 2016/0157964 A1 | * | 6/2016 | Suttin | A61B 34/20 433/27 |
| 2016/0227128 A1 | * | 8/2016 | Um | H04N 5/2258 |
| 2017/0143442 A1 | * | 5/2017 | Tesar | A61B 90/37 |
| 2017/0150020 A1 | * | 5/2017 | Edwards | H04N 5/2256 |
| 2017/0213070 A1 | * | 7/2017 | Aghamohammadi | B25J 9/163 |
| 2017/0244904 A1 | * | 8/2017 | Grossnickle | H04N 13/246 13/246 |
| 2018/0126553 A1 | * | 5/2018 | Corkum | B25J 9/1697 |
| 2018/0272539 A1 | * | 9/2018 | Kitamura | B25J 9/1697 |
| 2019/0005661 A1 | * | 1/2019 | Steinle | G06T 7/33 |
| 2019/0011921 A1 | * | 1/2019 | Wang | G06T 7/70 |
| 2019/0259150 A1 | * | 8/2019 | High | B64C 39/024 |
| 2019/0272677 A1 | * | 9/2019 | Pinti | G06F 3/0304 |

* cited by examiner

ROBOTIC MANIPULATION USING AN INDEPENDENTLY ACTUATED VISION SYSTEM, AN ADVERSARIAL CONTROL SCHEME, AND A MULTI-TASKING DEEP LEARNING ARCHITECTURE

FIELD

The present disclosure relates to automation systems, and more particularly to systems and methods for controlling and operating an automation system based on landmark detection.

BACKGROUND

The statements in this section merely provide background information related to the present disclosure and may not constitute prior art.

Visual servoing has been used in automation systems. Visual servoing refers to vision-based robotic control, which uses visual data to perform tasks, such as assembling, delivering or inspecting individual machine components or assembled machine components. Landmark detection is at the heart of many automated tasks. Landmark detection uses visual data captured by a vision system to detect points of interest or reference points (i.e., landmarks) on a machine component or assembled machine components. Exemplary landmarks on machine components include: a center of a threaded hole, a tip and axis of a pin or a screw, a center of a gear piece, gear teeth, a hinge of the vehicle door, etc.

Typically, operating an automation system based on landmark detection has its limitations. First, it is difficult to manually develop feature extraction schemes suitable for reliable detection of landmarks on various objects. Even when such algorithm is developed successfully, they have to be tailored to a specific machine component and cannot be used in other applications. For example, a screw tip detection algorithm cannot be used to detect gear teeth and vice versa. Second, it is difficult to properly adjust the field of view of the camera in a dynamics environment where various objects or machine components move. Sometimes, the field of view of the camera may be fully blocked or become suboptimal for landmark detection. Third, it is difficult to simultaneously and automatically control both the vision system and the robotic manipulator.

The above-mentioned problems and associated needs are addressed in the present disclosure.

SUMMARY

In one form of the present disclosure, an automation system is provided, which includes a manipulation system including a manipulator for moving an object to a target location, a vision system for detecting landmarks on the object and the target location, and a learning and control module. The vision system is movable. The learning and control module is configured to control a movement of the manipulator and change a field of view of the vision system independent of the movement of the manipulator.

In other features, the vision system includes at least one movable camera. A position and an orientation of the at least one movable camera is independently controllable relative to the manipulator. The learning and control module is configured to adjust the field of view of the camera such that a distance between the object and the target location is at a maximum in the field of view when the object is moved towards the target location. The learning and control module is configured to control the manipulator to move the object closer to the target location while controlling a movement and a pose of the camera of the vision system to obtain a maximum distance between the object and the target location in the field of view of the camera.

The vision system is mounted on the manipulation system and is independently controllable relative to the manipulator. The learning and control module includes a common module and a plurality of output modules. The common module includes a common convolutional network and outputs pre-processed visual data to the plurality of output modules. One of the output modules is a landmark detection module that outputs 2D coordinates of the landmarks. The plurality of output module outputs information selected from a group consisting of a color of the object, a shape of the object, a component type of the object, background pixels, the pose of the camera, and a distance between the camera and the object. The object and the target location are mating machine components. The manipulation system includes a primary robotic arm and a secondary robotic arm. The vision system is mounted to the secondary robotic arm. The secondary robotic arm may include a pair of endoscopes.

In another form of the present disclosure, a method of controlling an automation system is provided. The method includes: moving an object toward a target location; and continuously and simultaneously moving a camera and adjusting a pose of the camera when the object is moved toward the target location such that a distance between the object and the target location is at a maximum in a field of view of the camera.

In other features, the method may further include capturing an image of the object and the target location, obtaining coordinates of landmarks on the object and the target location, controlling the movement and the pose of the camera independently from the moving of the object, and extracting 2D coordinates of landmarks on the object and the target location from the captured images, and moving the object based on the 2D coordinates of the landmarks extracted from the captured images, and continuously adjusting a pose and movement of the camera during the capturing of the images. The object and the target location are mating components.

It should be noted that the features which are set out individually in the following description can be combined with each other in any technically advantageous manner and set out other variations of the present disclosure. The description additionally characterizes and specifies the present disclosure, in particular in connection with the figures.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
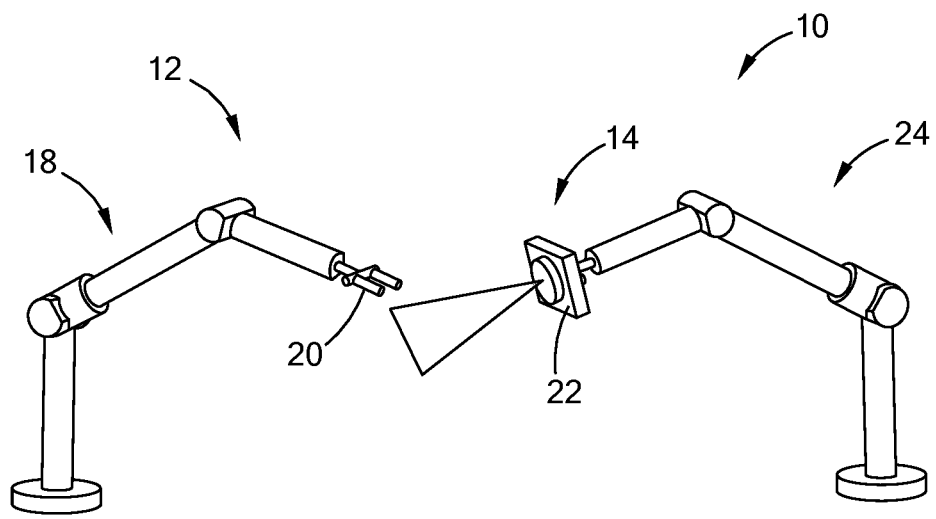
FIG. 1 is a schematic view of an automation system constructed in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In this application, including the definitions below, the term "module" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Referring to FIG. 1, an automation system 10 constructed in accordance with the teachings of the present disclosure includes a manipulation system 12, a vision system 14, and a learning and control module 16 (shown in FIG. 3) for controlling and operating the manipulation system 12 and the vision system 14. The manipulation system 12 includes one or more primary robotic arms 18, and a manipulator 20, such as an end effector, pivotably connected to the primary robotic arms 18. The manipulation system 12 is configured to move an object, such as a machine component, to a target location (including a counterpart machine component) for various applications such as a delivery task or an assembling task.

Figure 2:
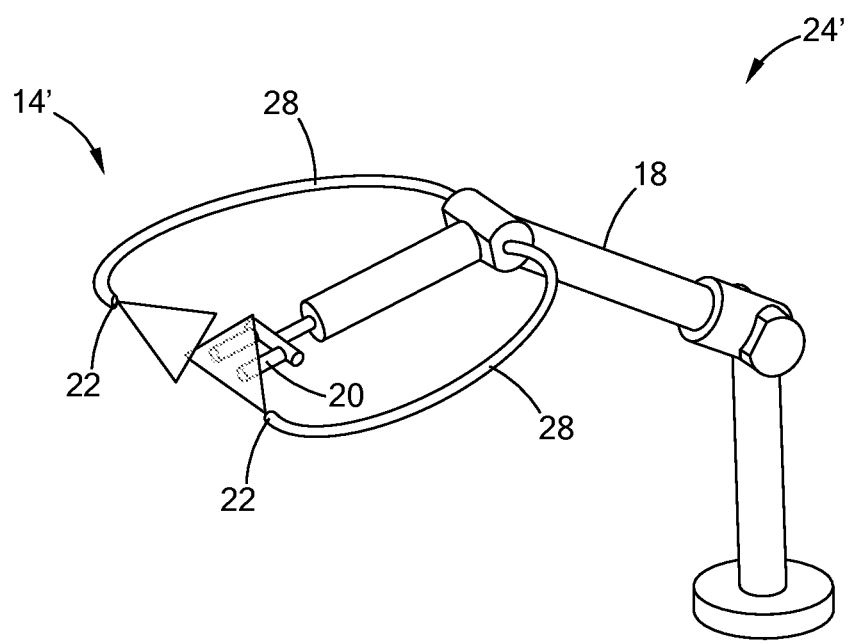
FIG. 2 is a schematic view of a variant of an automation system constructed in accordance with the teachings of the present disclosure.

In one form, the vision system 14 includes at least one camera 22 mounted to a robotic arm 24, which may be a multi-joint conventional robotic arm separate from the manipulation system 12. In another form, as shown in FIG. 2, a vision system 14' may be integrated into the manipulation system 12 to form an integrated vision and manipulation system 24. The vision system 14' includes at least one camera 22 mounted to a secondary robotic arm, which is mounted to the primary robotic arm 18. The secondary robotic arm has multiple degrees of freedom such that the cameras 22 can be controlled independently from the manipulator 20 and such that the orientation/pose of each camera 22 can be adjusted relative to the manipulator 20 and relative to the object to be moved by the manipulator 20. The orientation/pose of the cameras 22 relative to the manipulator 20, as well as the distance between the cameras 22 and the manipulator 20 can be controlled independently from the manipulator 20 in order to obtain a better view of the object and the target location and the landmarks thereon.

In the exemplary embodiment, the secondary robotic arm may be in a form of endoscopes 28. Two (or more) endoscopic cameras may be attached to free ends of the endoscopes 28. The free ends of the endoscopes 28 are disposed close to the manipulator 20 such that the cameras 22 can obtain a better view of the object and the target location and the landmarks thereon when the manipulator 20 manipulates the object. Although the vision system 14' is mounted to the manipulation system 18, the vision system 14' and the manipulator 20 have their own degrees of freedom and their actuation mechanism such that the vision system 14' can change its pose with respect to the manipulated object in order to find best viewing perspective.

Figure 3:
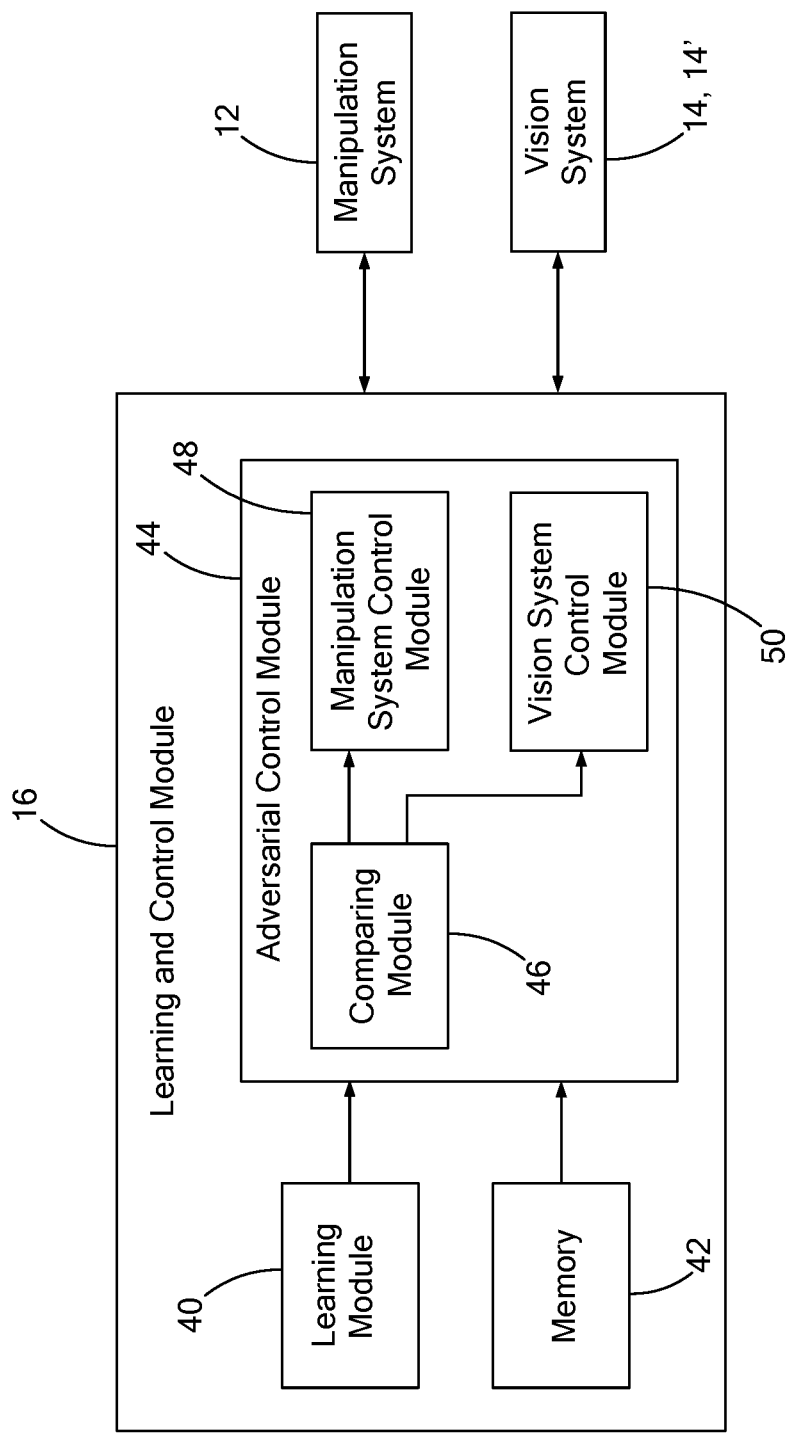
FIG. 3 is a block diagram of a learning and control module of the automation system constructed in accordance with the teachings of the present disclosure.

Referring to FIG. 3, the learning and control module 16 is configured to simultaneously actuate the manipulation system 12 and the vision system 14, 14' to control movement of the manipulator 20 and movement and orientation of the camera 22 based on an adversarial control scheme. More specifically, the learning and control module 16 includes a learning module 40, a memory 42, and an adversarial control module 44. The adversarial control module 44 includes a comparing module 46, a manipulation system control module 48, and a vision system control module 50. The learning module 40 processes visual data captured by and sent from the vision system 14, 14'. The memory 42 stores desired landmark coordinates. The desired landmark coordinates are target landmark coordinates that are predetermined and that may be obtained by actual measurements.

Figure 4A:
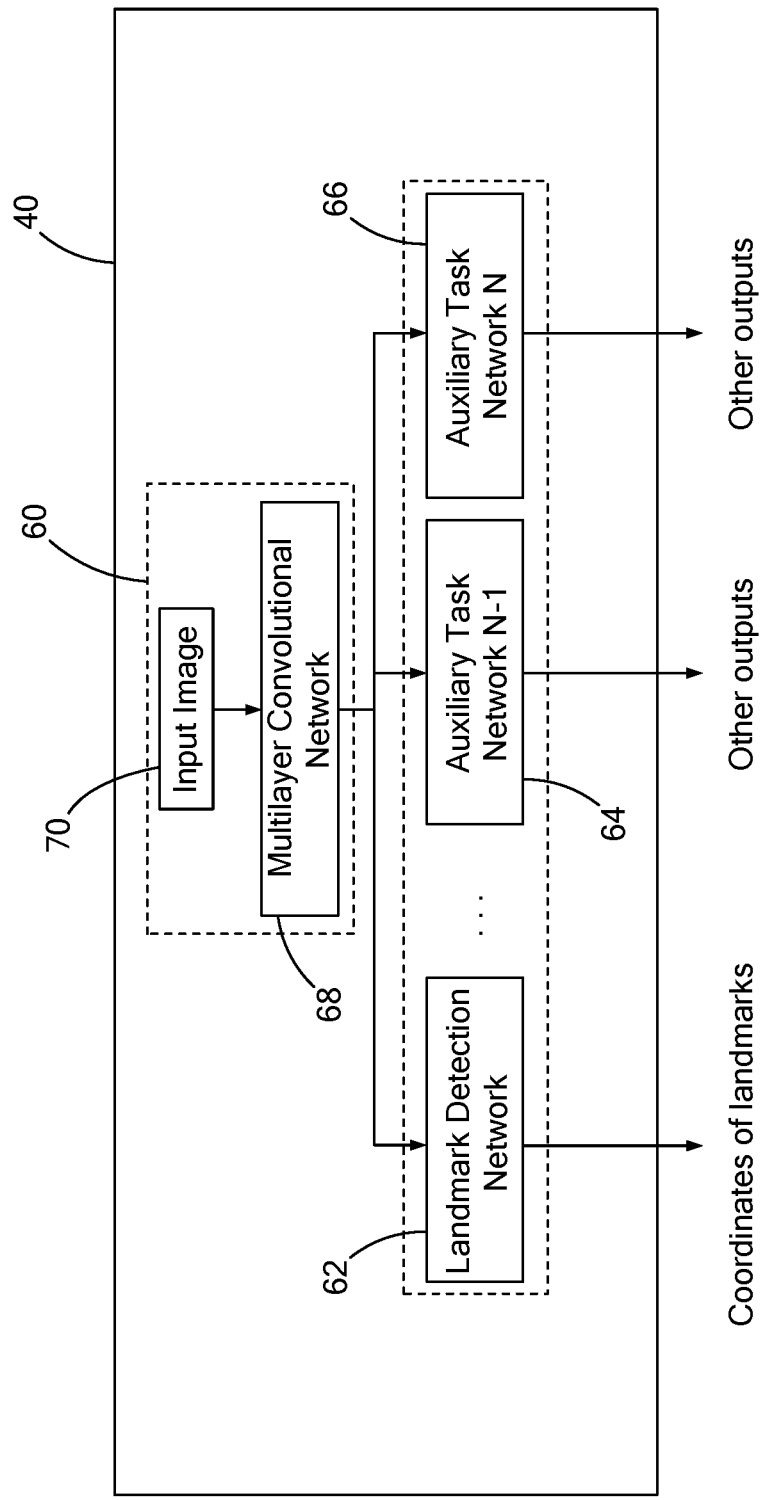
FIG. 4A is a block diagram of a learning module of FIG. 3.

Referring to FIG. 4A, in one form, the learning module 40 includes a multi-tasking deep learning scheme for landmark detection. The learning module 40 includes a common module 60, and a plurality of output modules 62, 64, 66. The plurality of output modules includes a landmark detection module 62, and a plurality of auxiliary task modules 64, 66, each including a neural network.

The common module 60 includes a multilayer convolutional network 68 as an input layer for receiving input images 70 (i.e., the visual data) from the vision system 14, 14'. The common module 60 is configured to pre-process the visual data and output pre-processed visual data to the plurality of output modules 62, 64, 66. The convolutional network of the common module 60 applies a convolution operation to the input (i.e., the input images 70) and passes the results to the plurality of output modules 62, 64, 66.

The plurality of output modules 62, 64, 66 include neural networks as output layers, including a landmark detection network, and auxiliary task network N−1, N. The landmark detection module 62 and the auxiliary task modules 64, 66 provide independent outputs and are each responsible for a unique task. The plurality of output networks are independent, each targeting a different aspect of a given visual perception task, but are fully connected and correlated to enable successful implementation of one task for improved performance of the other output modules.

The landmark detection module 62, in its simplest form, outputs only the 2D coordinates of the landmarks in the image of the object and the target location of the object in a given image input using learned information about the orientation of the camera 22 with respect to the object. For example, the learning module 40 receives captured images from the camera as training data. The learning module 40 outputs information, including but not limited, component type, background pixels, component distances, component orientation with respect to camera, and the 2D coordinates of the detected landmarks through the plurality of output modules 62, 64, 66. Among the outputs from the learning module 40, the 2D coordinates of the landmarks from the landmark detection module 62 are the main outputs that are sent to the adversarial control module 44. The outputs of the auxiliary task modules 64, 66 may not be directly used, but can provide a platform to incorporate relevant information into the multiplayer convolutional network 68 of the common module 60 for better performance. The detected landmark coordinates may be used as part of an inspection or visual servoing task, including assembling machine components, or detecting loose connections on an engine wiring.

One or more of the neural networks of the common module 60 and all of the output modules can be of a recurrent type (RNN) which inherently incorporates feedback of the current output information to influence future behavior of the network.

The advantages of providing the auxiliary output modules 64, 66 in the learning module 40 are described below. The training data supplied to a conventional learning module include only annotated images with known landmark locations. The network of the conventional learning module may be susceptible to overfitting the training dataset and may be easily confused when the orientations of the camera with respect to the landmarks are different from those observed in the training set. To tackle this limitation, the network is configured to also learn the orientation of the camera with respect to the machine components through an auxiliary output, which forces the multiplayer convolutional network 68 of the common module 60 to learn the differences between various camera perspectives. This auxiliary training stage incorporates additional information into the multiplayer convolutional network 68 of the common module 60 while the plurality of output modules 62, 64, 66 use the output of the common module 60 to output the information about the pose of the camera 22 in addition to the landmark coordinates. As such, the training dataset is augmented with available pose information in addition to the landmark annotations. Following a similar approach, the number of the auxiliary task modules 64, 66 can be increased in order to incorporate other available field information into the common module 60 and improve its generalization performance.

The number of the output modules 64, 66 for auxiliary tasks depends on the availability of the computational resources for the training and inference stages, as more output modules are computationally more demanding. The landmark detection module 62 is the only output of interest. The output of the auxiliary task modules 64, 66 may not be needed directly during normal operation of the automation system 10 or 24 but may be used to incorporate other available information for initial mechanical setup of the automation system 10 or 24 and the machine learning phase preceding the normal operation of the automation system 10 or 24. The objective of including unrelated tasks is to improve network performance and generalization capability for landmark detection.

The exemplary output modules 64, 66 may perform auxiliary tasks other than the landmark detection, including but not limited, component type detection, background exclusion, component orientation detection, distance estimation, motion speed detection, lighting level detection. For example, the network of one auxiliary output module may be configured to learn to distinguish the pixels that belong to engine cables from those associated with an engine cover, when there is an overlap between the engine cables and the engine cover, thereby distinguishing different machine component. The network of another auxiliary output module may be configured to learn to discard points that have no relevance to the components of interest, such as a cable on the floor that happens to be in the background. The network of still another auxiliary output module may be configured to learn to estimate the distance of various components from the camera, which helps the network to accommodate the size variations of various components due to the objects being too close or too far from the camera. Any other information relevant to the landmarks of interest can be incorporated into the network to accommodate the size variations of various components due to being too close or too far from the camera. Any other information relevant to the landmarks of interest can be incorporated into the network in a similar fashion for improved performance.

Figure 4B:
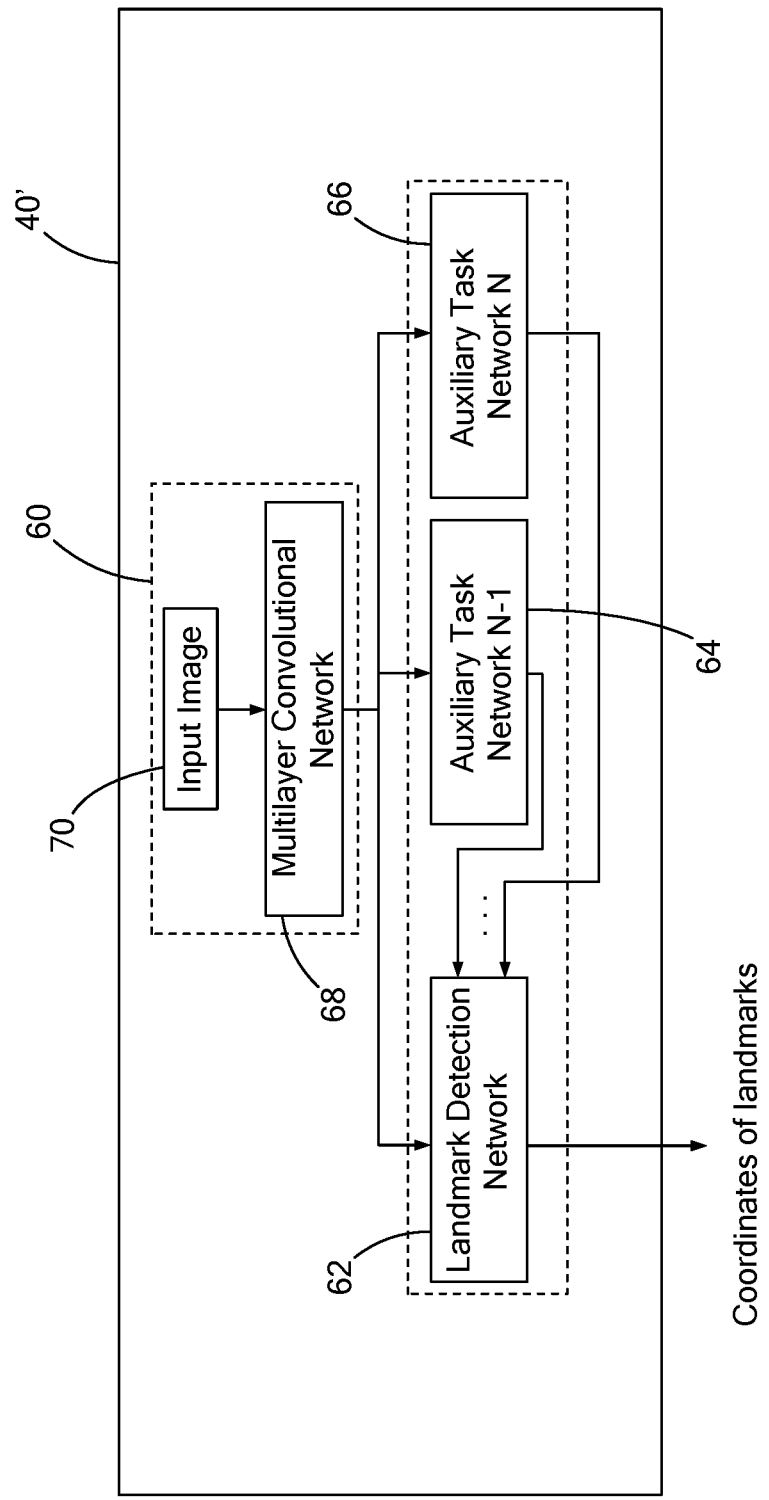
FIG. 4B is a block diagram of a variant of a learning module of FIG. 3.

Referring to FIG. 4B, alternatively and in another form, a variant of the learning module 40' is similar to the learning module 40 of FIG. 4B except for the use of outputs of the output modules 64, 66. As shown, the outputs of all of the output modules 64, 66 except the landmark detection module 62 are used as a feedback and combined with the outputs of the common module 60 to form inputs to the landmark detection module 62. The extra information forces the common module 60 and the landmark detection module 62 to more effectively process the visual data from the camera 22 for the main task, i.e. landmark detection for visual servoing.

After the learning module 40 or 40' is properly trained in the learning phase, the learning module 40 or 40' outputs and sends the extracted landmark coordinates to the adversarial control module 44, which controls and operates the manipulation system 12, 18 to perform the assigned task while adversarially controlling the vision system 14, 14' based on updated landmark coordinates.

Referring back to FIG. 3, the adversarial control module 44 includes a comparing module 46, a manipulation system control module 48, and a vision system control module 50. The comparing module 46 receives the landmark coordinates output from the landmark detection module 62 of the learning module 40, and the desired landmark coordinates from the memory 42, and compares the current landmark coordinates (determined based on the visual data captured by the camera) against the desired landmark coordinates (i.e., target landmark coordinates predetermined by actual measurements). Based on this comparison, the manipulation system control module 48 controls the manipulation system 12 and the vision system control module 50 controls the vision system 14, 14' based on an adversarial control scheme.

In an assembling task by a robotic arm, the control objective is to push certain mating landmarks on the mating components towards each other. For example, in an electric plug insertion task, the control objective is to minimize the distance between the tip of the male portion of the connector and a point inside the female mating component. The tip of the male portion and the point inside the female mating component constitute mating landmarks. Therefore, for an assembling task, the objective of the manipulation system 12 is to move the mating landmarks closer to each other. For a delivery task, the objective of the manipulation system 12 is to move the landmarks of interest on an object to a target location.

In the adversarial control scheme of the present disclosure, the objective of the vision system 14, 14' is to find a pose that achieves a maximum distance between the mating landmarks (i.e., male and female parts of the connector) in a field of view of the camera 22. Therefore, the objective of the vision system 14, 14' opposes that of the manipulator 20 of the manipulation system 12. To achieve this opposition of the objectives, in one embodiment of the invention, a simple negation of objective of the manipulation system 12 can form the objective for the vision system 14.

More specifically, when the manipulator 20 moves the mating landmarks closer to each other, the camera 22 is moved and rotated to find a pose such that the distance between the mating landmarks is at its maximum in the camera's field of view. Because the vision system 14, 14' can be controlled independently from the manipulation system 12, the pose and orientation of the camera 22 can be adjusted independently from the manipulation system 12 to allow for a better view of the mating landmarks. By adjusting the pose of the camera 22 to achieve a maximum distance between the mating landmarks in the camera's field of view, the remaining distance between the mating landmarks can be better revealed, thereby better revealing possible positioning error and the additional movement necessary to complete the task. This process continues until both objectives of the vision system 14, 14' and the manipulation system 12 converge to their minimum. In other words, the process ends when the mating landmarks meet each other (zero distance) and neither the camera nor the manipulator 20 can lower their optimization costs any further. Neither the camera nor the manipulator 20 can find a more desirable position than the current position, i.e., the maximum distance between the landmarks from the camera perspective is always zero (regardless of the pose) and similarly the manipulator cannot push the landmarks any further towards each other as they already met and any additional disturbance can only move them away from each other.

Figure 5:
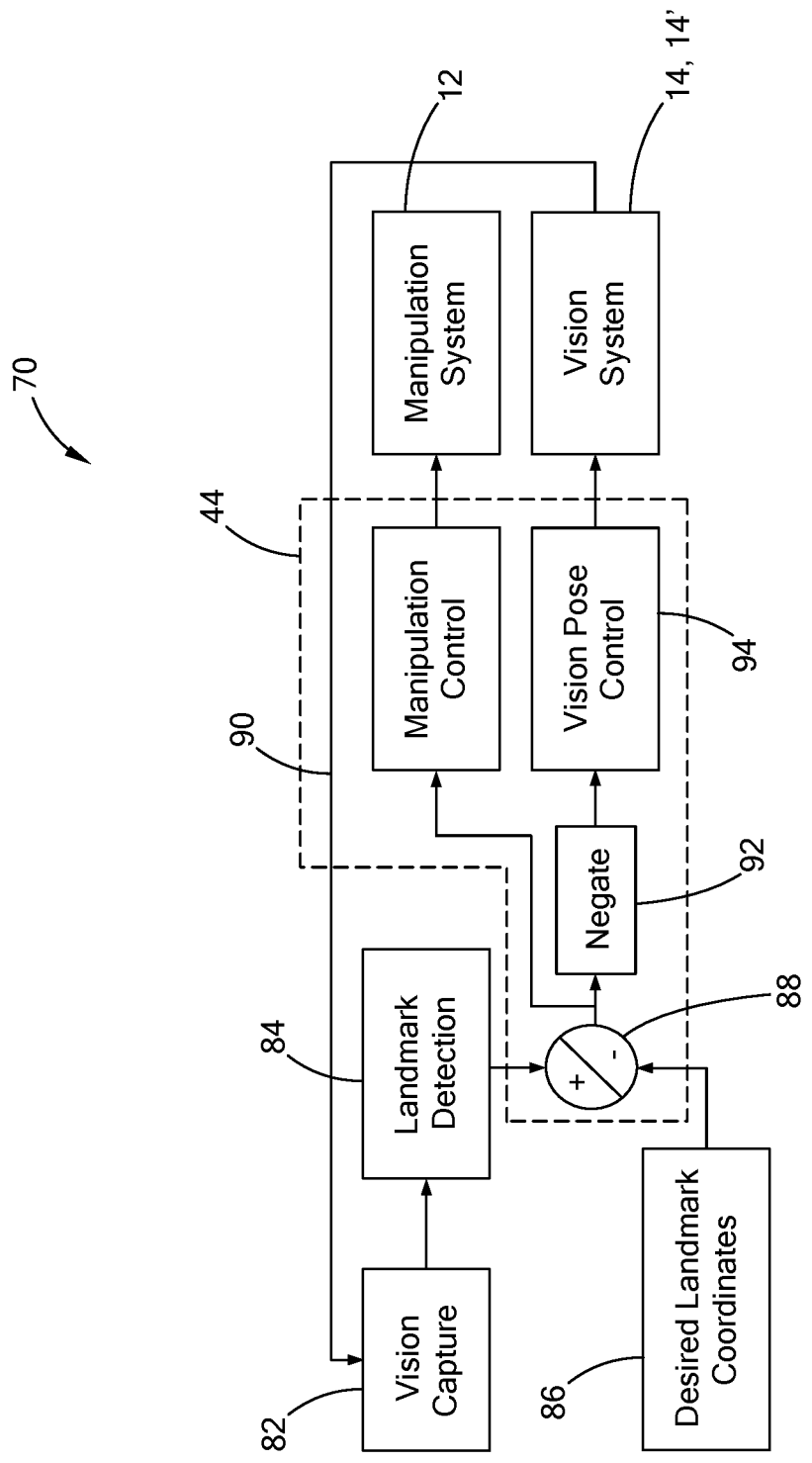
FIG. 5 is a flow chart of a method of controlling and operating an automation system in accordance with the teachings of the present disclosure.

Referring to FIG. 5, a flow chart of a method 70 of controlling and operating an automation system 10 using an adversarial control scheme is shown. The vision system 14, 14' captures images of landmarks of interest on an object and a target location in step 82. The captured images, i.e., the visual data, are sent to the learning and control module for processing. The landmark detection module 62 of the learning and control module extracts 2D coordinates of the landmarks from the visual data and outputs the 2D coordinates of the landmarks in step 84. The desired landmark coordinates, which are predetermined, are stored in the memory 42 in step 86.

The desired landmark coordinates from the memory 42 and the extracted landmark coordinates of the object and the target location are sent to the comparing module 46, which compares the desired landmark coordinates and the extracted landmark coordinates and determines a desired movement of the object in step 88. The manipulation system control module controls the manipulator system to move the object based on the desired movement in step 90.

On the other hand, in one embodiment of the invention, the adversarial control module negates the objective of the manipulation system and determines a desired movement/pose of the camera 22 in order to allow the mating landmarks to be at a maximum distance in the camera's field of view in step 92. Based on this information, the vision system control module adjusts the pose of the camera accordingly in step 94.

In summary, the adversarial control scheme is implemented for simultaneously positioning the manipulation system (particularly the manipulator) and the vision system (particularly the camera) with opposite objectives, hence the name adversarial. In one embodiment of the invention, the control objective for the vision system is a negated version of that of the manipulation system. In a visual servoing task, the object functions are defined in the image space of the vision system. Therefore, the manipulation system control module controls the manipulator to move the object closer to the target location. Simultaneously, the vision system control module controls the pose of the camera to obtain a view in which the distance between the object and the target location is at a maximum. During the movement of the manipulation system, the vision system continuously acquires images of the object and the target location for landmark detection and to extract landmark coordinates. The process ends when the mating landmarks meet each other and neither the camera nor the robotic manipulation can lower their optimization costs any further, i.e., neither of the camera and the robotic manipulation can achieve any further improvement as the distance between the landmark and the target positions are all zero.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An automation system comprising:
   a manipulation system including a manipulator for moving an object to a target location;
   a vision system for detecting a landmark on the object and the target location; and
   a learning and control module configured to control the manipulator to move the object closer to the target location while controlling a pose of the vision system independent of the movement of the manipulator such that the landmark on the object and the target location are in a field of view of the vision system and a distance between the landmark on the object and the target location is at its maximum in the field of view of the vision system.

2. The automation system according to claim 1, wherein the vision system is movable and comprises at least one camera, which is movable, a position and an orientation of the at least one camera being independently controllable relative to the manipulator.

3. The automation system according to claim 2, wherein the learning and control module is configured to move the at least one camera and change a pose of the at least one camera to adjust the field of view of the at least one camera.

4. The automation system according to claim 1, wherein the learning and control module is configured to control the manipulator to move the object closer to the target location while controlling a movement and a pose of a camera of the vision system to obtain a maximum distance between the landmark on the object and the target location in the field of view of the camera.

5. The automation system according to claim 1, wherein the vision system is mounted on the manipulation system and is independently controllable relative to the manipulator.

6. The automation system according to claim 1, wherein the learning and control module includes a common module and a plurality of output modules, the common module including a common convolutional network and outputting pre-processed visual data to the plurality of output modules.

7. The automation system according to claim 6, wherein one of the output modules is a landmark detection module that outputs 2D coordinates of the landmark on the object and the target location.

8. The automation system according to claim 6, wherein the plurality of output module outputs information selected from a group consisting of a color of the object, a shape of the object, a component type of the object, background pixels, the pose of the camera, and a distance between the camera and the object.

9. The automation system according to claim 1, wherein the object and the target location are mating machine components.

10. The automation system according to claim 1, wherein the manipulation system includes a primary robotic arm and a secondary robotic arm, wherein the vision system is mounted to the secondary robotic arm.

11. The automation system according to claim 10, wherein the secondary robotic arm includes a pair of endoscopes.

12. A method of controlling an automation system, comprising:

moving an object toward a target location; and continuously and simultaneously moving a camera and adjusting a pose of the camera when the object is moved toward the target location such that a distance between a landmark on the object and the target location is at a maximum in a field of view of the camera.

13. The method according to claim 12, further comprising capturing an image of the object and the target location.

14. The method according to claim 12, further comprising obtaining coordinates of the landmark on the object and the target location.

15. The method according to claim 12, further comprising controlling the movement and the pose of the camera independently from the moving of the object.

16. The method according to claim 12, wherein the object and the target location are mating components.

17. The method according to claim 12, further comprising extracting 2D coordinates of the landmark on the object and the target location from the captured images.

18. The method according to claim 17, further comprising moving the object based on the 2D coordinates of the landmark on the object and the target location extracted from the captured images.

19. The method according to claim 12, further comprising continuously adjusting a pose and movement of the camera during the capturing of the images.

* * * * *